United States Patent [19]

Kondo et al.

[11] Patent Number: 5,614,315

[45] Date of Patent: Mar. 25, 1997

[54] HEAT-SHRINKABLE MULTI-LAYER POLYOLEFIN FILMS

[75] Inventors: Kazuo Kondo; Teruo Tada, both of Marugame; Toyoki Wano, Zentsuji; Hideki Uehara, Takamatsu; Tomohisa Tsuchida, Kagawa-ken, all of Japan

[73] Assignee: Okura Industrial Co., Ltd., Amagasaki, Japan

[21] Appl. No.: 375,829

[22] Filed: Jan. 20, 1995

[51] Int. Cl.$^6$ .................. B32B 27/08; B32B 27/32; B65B 53/02

[52] U.S. Cl. .................. 428/332; 428/515; 428/516; 428/520; 428/34.9; 428/36.91

[58] Field of Search .................. 428/516, 34.9, 428/519, 523, 515, 332, 35.7, 36.91, 34.7, 520

[56] References Cited

U.S. PATENT DOCUMENTS

| | | | |
|---|---|---|---|
| 4,820,557 | 4/1989 | Warren et al. | 428/34.9 |
| 5,001,016 | 3/1991 | Kondo et al. | 428/516 |
| 5,279,872 | 1/1994 | Ralph | 428/34.9 |

FOREIGN PATENT DOCUMENTS

| | | |
|---|---|---|
| 0600425A1 | 6/1994 | European Pat. Off. . |
| 0634443A3 | 1/1995 | European Pat. Off. . |
| WO94/07954 | 4/1994 | WIPO . |

*Primary Examiner*—Paul J. Thibodeau
*Assistant Examiner*—Donald Lawrence Tarazano
*Attorney, Agent, or Firm*—Armstrong, Westerman, Hattori, McLeland & Naughton

[57] ABSTRACT

A heat shrinkable multilayer film which includes two outer layers consisting essentially of a polyethylene resin, and one or more inner layers interposed between the outer layers, wherein at least one of the inner layers comprises a blend of a polypropylene resin and a substantially linear ethylene/alpha-olefin copolymer, wherein said copolymer has a molecular weight distribution Mw/Mn of not greater than about 2 and a melt flow ratio $I_{10}/I_2$ of not smaller than 7.0.

12 Claims, No Drawings

HEAT-SHRINKABLE MULTI-LAYER POLYOLEFIN FILMS

BACKGROUND OF THE INVENTION

1. Field of the Invention

This invention relates generally to a multilayer film and, more specifically, to an easily producible, heat-shrinkable polyolefin multilayer film having excellent heat-shrinkability and tearing strength.

2. Background of Invention

In order for a heat-shrinkable film to easily provide a tight fit package, the film is required to have both high heat-shrinkability and high mechanical strengths, such as a tearing strength and resistance to breakage during heat sealing and during use. In addition, the film with such desired properties must be produced without difficulty.

A heat-shrinkable film in a tubular form is generally produced by a process in which a thermoplastic resin melt is extruded through a die to form a tubular preform, the preform being rapidly cooled with water, then reheated to a temperature lower than the melting point thereof but higher than the softening point or glass transition point thereof and stretched by a blown bubble method. The resulting biaxially oriented film when heated shows a property to return to the original dimensions.

The characteristics of the heat-shrinkable film, therefore, depend not only upon the physical properties of the raw material thermoplastic resins but also upon stretching conditions such as the stretching temperature and the drawing ratio. For example, a heat-shrinkable film formed mainly of a polypropylene having a high melting point, a high degree of crystallinity and good stretching processability is not good in low temperature shrinkability and has a low maximum shrinkage value, although the tensile strength and shrinkage stress of the film are high. In contrast, a heat-shrinkable film formed mainly of a resin having a low melting point and low degree of crystallinity, such as a low density polyethylene (hereinafter referred to as LDPE), a linear low density polyethylene (hereinafter referred to as LLDPE), a very low density linear polyethylene (hereinafter referred to as VLDPE) or an ethylene/vinyl acetate copolymer (hereinafter referred to as EVA), exhibits low temperature shrinkability, a low shrinkage stress and excellent heat sealability. However, since such a low melting point resin is stretchable only in a narrow temperature range, it is necessary to strictly control the stretching temperature or to cross-link the resin by irradiation with an electron beam.

To cope with the foregoing problems, there have been proposed various kinds of heat-shrinkable films in which two or more different resins are used in combination as a blend and/or as a laminate.

U.S. Pat. Nos. 4,194,039 and 4,229,241 disclose that a heat-shrinkable, three layer film composed of two skin layers of an ethylene/propylene copolymer and a core layer of a blend of an ethylene/vinyl acetate copolymer with an ethylene/butylene copolymer shows such a shrinkage stress, clarity, sealing temperature, a wide temperature range for shrinking and a tearing strength that would not be obtainable with a polyolefin single layer film.

U.S. Pat. No. 4,532,189 discloses a heat-shrinkable multilayer film having a core layer of LLDPE or a linear medium density polyethylene (hereinafter referred to as LMDPE) and showing improved mechanical strengths.

U.S. Pat. No. 4,551,380 discloses a heat-shrinkable three layer film having a core layer of a blend of LLDPE, LMDPE and EVA and exhibiting good heat sealability and shrinkability.

U.S. Pat. No. 4,820,557 discloses a high abuse-resistant, heat-shrinkable film including at least one layer of an ethylene/alpha-olefin copolymer having a density of 0.935 g/cm$^3$ or less and a lower $I_{10}/I_2$ ratio in comparison with the corresponding ethylene/alpha-olefin which has the same comonomer, the same density and the same melt index at 190° C. and 2.16 kg loading.

U.S. Pat. No. 5,059,481 discloses a puncture-resistant, heat-shrinkable film which includes VLDPE having a density of 0.86–0.91 g/cm$^3$ and a 1% modulus of below 140,000 kPa and which shows a shrinkage value of 30–50%.

U.S. Pat. No. 4,837,084 discloses that a heat-shrinkable multilayer film containing a layer of a copolymer of ethylene and an alpha-olefin with six or more carbon atoms having a density of 0.910 g/cm$^3$ or less and a melt index of 2 or less exhibits excellent heat-shrinkability, orientation speed properties and abuse-resistant properties.

U.S. Pat. No. 4,302,557 discloses a cold drawn film having excellent low temperature shrinkability and formed of a blend of (A)+(B), (B)+(C) or (A)+(B)+(C), wherein (A) is a non-rigid polyolefin resin such as EVA, (B) is an ethylene/alpha-olefin elastomer and (C) is a rigid polyolefin resin such as polypropylene.

U.S. Pat. No. 5,272,016 discloses that a heat-shrinkable multilayer film having opposite outer layers each formed of a blend of VLDPE (density of 0.914 g/cm$^3$ or less) with an ethylene/alpha-olefin plastomer (density of 0.90 g/cm$^3$ or less) is suited for overwrapping trays.

U.S. Pat. Nos. 4,923,722, No. 5,001,016 and 4,948,657 disclose that a heat-shrinkable multi-layer film having a core or inner layer of a blend of polypropylene with VLDPE and outer layers each formed of polypropylene shows good low temperature shrinkability. The tearing strength of such a layer is 4.0–11.6 kg/cm (tearing load is 8.0–23.2 g at 20 µm) which is lower than that of a heat-shrinkable film formed mainly of LLDPE, VLDPE or EVA.

SUMMARY OF THE INVENTION

It is an object of the present invention to provide a polypropylene-containing, heat-shrinkable film which has good orientation processing characteristics and an improved tearing strength and which is useful for the heat shrinking packaging of various articles.

Another object of the present invention is to provide a heat-shrinkable film of the above-mentioned type which shows good shrinkage characteristics at a low temperature and which shows a high maximum shrinkage value.

It is a further object of the present invention to provide a heat-shrinkable film of the above-mentioned type which is excellent in slippage and anti-blocking properties and which gives easily openable packages.

It is yet a further object of the present invention to provide a heat-shrinkable film of the above-mentioned type which exhibits excellent heat-sealability and optical characteristics.

In accomplishing the foregoing objects, the present invention provides a heat-shrinkable multilayer film including two outer layers each formed of a polyethylene resin, and one or more inner layers interposed between the outer layers, wherein at least one of the inner layers is formed of a blend of a polypropylene resin with a substantially linear ethylene/alpha-olefin copolymer having a molecular weight distribution Mw/Mn of not greater than about 2 and a melt flow ratio $I_{10}/I_2$ of not smaller than 7.0.

Other objects, features and advantages of the present invention will become apparent from the detailed description of the preferred embodiments of the invention to follow.

DETAILED DESCRIPTION OF THE PREFERRED EMBODIMENTS OF THE INVENTION

The heat-shrinkable film according to the present invention is a laminate having two outer layers each formed of a polyethylene resin and one or more inner layers interposed between the outer layers. Thus, the heat-shrinkable film is a multilayer film having three or more layers.

having a density of 0.890–0.910 g/cm$^3$. Examples of VLDPE include "VL103" (product of Sumitomo Chemical Co., Ltd.) and "EXACT 3028" (product of Exxon Chemical Co.). The ethylene/alpha-olefin elastomer is defined herein as an ethylene/alpha-olefin (with 3–8 carbon atoms) copolymer having a structure similar to LLDPE or VLDPE but having a lower degree of crystallinity (less than 30%) than LLDPE or VLDPE. The elastomer, therefore, does not have a melting point or has a very low melting point. "TAFMER A1085" (product of Mitsui Petrochemical Co., Ltd.) is an example of the elastomer.

Physical properties of typical polyethylenes are given below.

TABLE 1

| Resin olefin | AFNTY*1 octene-1 | LLDPE*2 octene-1 | VL103*3 butene-1 | EXACT*4 butene-1 | ELSTM*5 butene-1 |
|---|---|---|---|---|---|
| Density (g/cm$^3$) | 0.902 | 0.920 | 0.905 | 0.900 | 0.885 |
| Melting Point (°C.) | 100 | 121 | 117 | 92 | 71 |
| Melt Index (g/10 min) | 1.0 | 1.0 | 015 | 1.2 | 1.4 |
| $I_{10}/I_2$ | 8.9 | 7.8–8.0 | 10.2 | 5.5 | 4.8 |
| Mw/Mn | 2.0 | 3.5–3.8 | 4.7 | 2.0 | 2.0 |
| Tensile Strength (kg/cm$^2$) | | | | | |
| MD | 500 | 265 | 250 | 605 | 340 |
| TD | 265 | | | 510 | |
| Elongation (%) | | 1,000 | 900 | | 710 |
| MD | 570 | | | 590 | |
| TD | 560 | | | 680 | |

*1: Polyolefin plastomer; AFFINITY PL1880 (Dow Chemical)
*2: LLDPE; DOWLEX 2045 (Dow Chemical)
*3: VLDPE; VL103 (Sumitomo Chemical)
*4: VLDPE; EXACT 3028 (Exxon Chemical), single site catalyst
*5: Ethylene/alpha-olefin elastomer; TAFMER A1085 (Mitsui Petrochemical)

It is important that at least one of the inner layers should be formed of a blend of a polypropylene resin with a substantially linear ethylene/alpha-olefin copolymer having a molecular weight distribution Mw/Mn of not greater than about 2 and a melt flow ratio $I_{10}/I_2$ of not smaller than 7.0.

The molecular weight distribution Mw/Mn is a ratio of the weight average molecular weight to the number average molecular weight of the copolymer, while the melt flow ratio $I_{10}/I_2$ is a ratio of the melt index at the 10 kg loading to the melt index at the 2.16 kg loading at 190° C. as per ASTM D1238. The substantially linear ethylene/alpha-olefin copolymer having the above specific Mw/Mn and $I_{10}/I_2$ will be referred to in the present specification as "polyolefin plastomer".

The polyolefin plastomer preferably has a density of about 0.890–0.935 g/cm$^3$, more preferably 0.890–0.910 g/cm$^3$, and a melt index of 0.8–2.0 g/10 min at 2.16 kg loading 190° C. as per ASTM D1238. The alpha-olefin constituting part of the polyolefin plastomer preferably has 4–8 carbon atoms, more preferably 8 (octene-1). Plastomers commercially available as AFFINITY (trademark of The Dow Chemical Company) may be suitably used as the polyolefin plastomer. The polyolefin plastomer is distinguished from LLDPE, VLDPE and an ethylene/alpha-olefin elastomer in Mw/Mn and/or $I_{10}/I_2$.

LLDPE is defined herein as an ethylene/alpha-olefin (with 4–8 carbon atoms) copolymer having a density of greater than 0.910 g/cm$^3$ but not greater than 0.925 g/cm$^3$. "DOWLEX 2045 A" (product of The Dow Chemical Company) is an example of LLDPE. VLDPE is defined herein as an ethylene/alpha-olefin (with 4–8 carbon atoms) copolymer The polypropylene resin used in conjuction with the polyolefin plastomer may be a propylene homopolymer or a copolymer of propylene with an olefin. A polypropylene resin having a melt index of 1–4 g/10 min. is preferably used. Illustrative of suitable polypropylene resins are ethylene/propylene copolymers, propylene/butene-1 copolymers, ethylene/propylene/butadiene terpolymers.

The weight ratio of the polyolefin plastomer to the polypropylene resin in the blend is preferably 20:80 to 60:40, more preferably 30:70 to 50:50. When the amount of the polypropylene resin is smaller than the above preferred range, the stretching processing properties of the film is lowered so that it is necessary to perform a cross-linking treatment by irradiation with an electron beam or the like radiation before stretching. Too large an amount of the polypropylene resin will adversely affect the tearing strength of the heat-shrinkable film.

Any polyethylene resin may be used for each of the two outer layers. Illustrative of suitable polyethylene resins are LDPE, LLDPE, VLDPE, EVA and polyolefin plastomers. Especially preferred is the use of LLDPE, VLDPE, polyolefin plastomers or a mixture thereof, for reasons of improved stretch processing properties, tearing strength, heat-shrinkability, surface slippage and Young's modulus.

The heat-shrinkable multilayer film according to the present invention may include one or more inner layers in addition to the blend resin layer or layers of the above-described blend of the polypropylene resin with the polyolefin plastomer. Such an additional layer or layers may be formed of a polyethylene resin or a mixture of a polyethylene resin with an adhesive resin. For reasons of cost reduction and improved interlayer adhesion, it is preferred that the additional layer or layers be formed of a mixture of the outer layer resin with the blend layer resin, which resins are recovered as trimmings or chips during the course of the preparation of the heat-shrinkable film.

For example, in one preferred embodiment, the heat-shrinkable multilayer fill is a five layer laminate, wherein the inner layers consist of two intermediate layers and a core layer interposed between the two intermediate layers, wherein each of the intermediate layers is formed of the blend of the polypropylene rash with the polyolefin plastomer and wherein the core layer is formed of a mixture of the polyethylene resin obtained from the outer layers with the blend obtained from the intermediate layers.

The thickness of the heat-shrinkable multilayer fill is preferably about 10–35 μm. The proportion in thickness of respective layers constituting the film varies with the intended use thereof and the kinds of the raw material resins. In the case of a five layer film consisting of (outer layer)/(intermediate layer)/(core layer)/(intermediate layer)/(outer layer), the proportion in thickness of respective layers is preferably (10–20%)/(15–30%)/(20–40%)/(15–30%)/(10–20%), wherein the percentages are based on the total thickness of the film, for reasons of optimum tearing strength and stability in production process. The heat-shrinkable multilayer film preferably has a shrinkage value of 15–30% at 90° C. in both machine and transverse directions.

The multilayer film according to the present invention may be produced as follows. The raw material resins are charged in respective extruders, melted and coextruded through a multilayer die to form a tubular film. The extruded film is rapidly cooled with water. The resulting tube is preheated in a preheating zone and is fed to a heating zone where it is heated to a stretching temperature. Air is fed into the heated tube so that the tube is inflated and biaxially oriented. The stretched tube is then fed to an annealing zone where it is heated to prevent spontaneous shrinkage thereof during transportation and storage and to uniformize internal strain thereof.

The heat-shrinkability of the thus obtained heat-shrinkable film depends on the stretching temperature and drawing ratio. Generally, the heat-shrinkable film obtained at a stretching temperature (film temperature) of 90°–120° C. with a drawing ratio of 3–4 in both the machine and transverse directions shows a shrinkage value at 90° C. of at least 15% and a maximum shrinkage value of 50% or more in both the machine and transverse directions.

If desired, the film is subjected to a cross-linking treatment by irradiation with an electron beam or the like actinic radiation before or after the biaxial stretching to impart a heat resistance to the film.

The following examples will further illustrate the present invention.

Examples 1–5 and Comparative Examples 1–5

Five-layered films each including a core layer, two intermediate layer sandwiching the acre layer, and two outer layers were produced using the resins selected from Resins A–J and shown in Table 2. Resin A–J are as follows:

Resin A: Polyolefin plastomer, Affinity PL1880 (Dow Chemical; Details are shown in Table 1);

Resin B: Polyolefin plastomer, Affinity PF1140 (Dow Chemical; olefin: octene-1; density: 0.895 g/cm$^3$; MI: 1.6 g/10 min; $I_{10}/I_2$: 10.1, Mw/Mn: 2.0);

Resin C: Polyolefin plastomer, Affinity PL1840 (Dow Chemical; olefin: octene-1; density: 0.908 g/cm$^3$; MI: 1.0 g/10 min; $I_{10}/I_2$: 9.0, Mw/Mn: 2.0);

Resin D: LLDPE; Dowlex 2045 (Dow Chemical; Details are shown in Table 1);

Resin E: LLDPE; FZ102 (Sumitomo Chemical; olefin: hexene-1; density: 0.912 g/cm$^3$; MI: 0.8 g/10 min; $I_{10}/I_2$: 8.9; Mw/Mn: 4.1);

Resin F: LLDPE; Attane 4201 (Dow Chemical; olefin: octene-1; density: 0.912 g/cm$^3$; MI: 1.0 g/10 min; $I_{10}/I_2$: 8.2; Mw/Mn: 3.8);

Resin G: VLDPE; VL103 (Sumitomo Chemical; Details are shown in Table 1);

Resin H: VLDPE; EXACT 3028 (Exxon Chemical; Details are shown in Table 1);

Resin I: polypropylene; WF905E (Sumitomo Chemical; ethylene/propylene copolymer; ethylene content: 4–7%; density: 0.890 g/cm$^3$; MI: 3.9 g/10 min);

Resin J: polypropylene; S131 (Sumitomo Chemical; ethylene/propylene copolymer; ethylene content: 4.7%; density: 0.890 g/cm$^3$; MI: 1.2 g/10 min)

The outer layer resin, intermediate layer resin and core layer resin were charged in respective extruders and coextruded through a circular die (diameter: 180 mm) at an extrusion rate of 50 kg/hour and at a die temperature of 210° C. to form a tubular extrudate. The extrudate was rapidly cooled to obtain a tubular preform having a diameter of 180 mm and a thickness of 220 μm. The preform was preheated, then heated to about 100° C. and, thereafter, biaxially stretched simultaneously in both the machine and transverse directions. The drawing ratio (MD×TD) was 3.9×3.4. The stretched tube was reheated to effect slight shrinkage (to a degree of 5–10%), thereby obtaining a heat-shrinkable film having a total thickness of 19 μm. The thickness proportion of (outer layer)/(intermediate layer)/(core layer)/(intermediate layer)/(outer layer) was (15%)/(17.5%)/(35%)/(17.5%)/(15%) in the case of Examples 1–4 and Comparative Examples 2–5, (10%)/(25%)/(30%)/(25%)/(10%) in the case of Example 5 and (20%)/(12.5%)/(35%)/(12.5%)/(20%) in the case of Comparative Example 1. The stretching processability (evaluated according to the following ratings: A . . . good, B . . . no good) and physical properties of the thus obtained films are shown in Table 3.

TABLE 2

| Example (Comp. Ex.) | 1 | 2 | 3 | 4 | 5 | (1) | (2) | (3) | (4) | (5) |
|---|---|---|---|---|---|---|---|---|---|---|
| Outer Layer | | | | | | | | | | |
| Resin C | | | 100 | | 100 | 100 | | | | |
| Resin D | 100 | 100 | | 100 | | | 100 | 100 | 100 | 100 |

TABLE 2-continued

| Example (Comp. Ex.) | 1 | 2 | 3 | 4 | 5 | (1) | (2) | (3) | (4) | (5) |
|---|---|---|---|---|---|---|---|---|---|---|
| Intermediate Layer | | | | | | | | | | |
| Resin A | 30 | 30 | 30 | | 40 | | | | | |
| Resin B | | | | 30 | | | | | | |
| Resin E | | | | | | | 30 | | | |
| Resin F | | | | | | | | 30 | | |
| Resin G | | | | | | | | | 50 | |
| Resin H | | | | | | | | | | 30 |
| Resin I | 70 | | 70 | 70 | 60 | 100 | 70 | | 50 | 70 |
| Resin J | | 70 | | | | | | 70 | | |
| Core Layer | | | | | | | | | | |
| Resin A | 16 | 16 | 16 | | 28 | | | | | |
| Resin B | | | | 16 | | | | | | |
| Resin C | | | 46 | | 30 | 60 | | | | |
| Resin D | 46 | 46 | | 46 | | | 46 | 46 | 46 | 46 |
| Resin E | | | | | | | 16 | | | |
| Resin F | | | | | | | | 16 | | |
| Resin G | | | | | | | | | 16 | |
| Resin H | | | | | | | | | | 16 |
| Resin I | 38 | | 38 | 38 | 42 | 40 | 38 | | 38 | 38 |
| Resin J | | 38 | | | | | | 38 | | |

TABLE 3

| | Example | | | | | (Comparative Example) | | | | |
|---|---|---|---|---|---|---|---|---|---|---|
| | 1 | 2 | 3 | 4 | 5 | (1) | (2) | (3) | (4) | (5) |
| Stretching Processability | A | A | A | A | A | A | A | A | A | B |
| Haze (%) | 3.6 | 3.4 | 2.6 | 3.5 | 2.8 | 2.6 | 3.8 | 3.3 | 3.9 | 3.3 |
| Young's Modulus MD/TD (kg/cm$^2$) | 3360/3530 | 3450/4000 | 2730/2540 | 3000/3120 | 2840/2560 | 4150/4530 | 3200/3300 | 3290/3440 | 3120/3250 | 2810/2790 |
| Tearing Load MD/TD (g) | 26/40 | 18/23 | 25/38 | 21/20 | 21/32 | 9/11 | 10/12 | 10/20 | 13/20 | 8/16 |
| Slippage MD/TD (×10$^{-2}$) | 20/14 | | 17/13 | | 76/22 | | 18/14 | | | 21/14 |
| Shrinkage Value MD/TD | | | | | | | | | | |
| at 90° C. | 20/24 | 19/24 | 21/25 | 18/20 | 24/25 | 22/24 | 18/20 | 19/20 | 22/24 | 20/22 |
| at 100° C. | 36/38 | 35/37 | 37/40 | 34/36 | 38/41 | 38/40 | 34/36 | 35/37 | 36/38 | 35/37 |
| at 110° C. | 50/52 | 50/53 | 52/54 | 49/51 | 54/55 | 46/48 | 49/50 | 50/51 | 50/52 | 49/51 |
| at 120° C. | 61/60 | 61/60 | 61/61 | 60/60 | 64/63 | 57/57 | 61/60 | 59/60 | 61/60 | 59/59 |

In Table 3, the tearing load is measured prior to the heat shrinkage of the film. The haze is measured in accordance with ASTM D1003, the Young's modulus is measured in accordance with ASTM D638, the tearing load is measured in terms of Elmendorf tearing strength in accordance with ASTM D1922, the slippage is measured in accordance with ASTM D1894 and the shrinkage is measured in accordance with a modified method of ASTM D2732.

As will be appreciated from the results summarized in Table 3, the heat-shrinkable films according to the present invention (Examples 1–5) have a high tearing strength, good stretching processability and excellent temperature shrinkability. The heat-shrinkable film of Comparative Example 1 in which each of the intermediate layers is formed only of the polypropylene resin has much lower tearing strength in comparison with that of Example 3 even though the thickness of the intermediate layers is smaller in Comparative Example 1. In the films of Comparative Examples 2 and 3 in which LLDPE is substituted for the polyolefin plastomer in Examples 1 and 2, no improvement of the tearing strength is obtainable. In the film of Comparative Example 4 in which VLDPE having a density of 0.905 g/cm$^3$ (similar to the polyolefin plastomer) is used, no improvement of the tearing strength is obtainable. In the film of Comparative Example 5 in which VLDPE having a density and a Mw/Mn ratio similar to those of the polyolefin plastomer is used, not only the tearing strength is lowered but also the stretching processability becomes poor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A heat-shrinkable multilayer film comprising two outer layers each consisting essentially of a polyethylene resin, and one or more inner layers interposed between said outer layers, wherein at least one of said inner layers is formed of a blend of a polypropylene resin with a linear ethylene/alpha-olefin copolymer, wherein said copolymer has a molecular weight distribution Mw/Mn of not greater than about 2 and a melt flow ratio of $I_{10}/I_2$ of not smaller than 7.0.

2. A multilayer film as claimed in claim 1, wherein said ethylene/alpha-olefin copolymer is an ethylene/octene-1 copolymer.

3. A multilayer film as claimed in claim 1, wherein said ethylene/alpha-olefin copolymer has a density of 0.890–0.910 g/cm³.

4. A multilayer film as claimed in claim 1, wherein said ethylene/alpha-olefin copolymer has a melt index of 0.8–2.0 g/10 min.

5. A multilayer film as claimed in claim 1, wherein the weight ratio of said ethylene/alpha-olefin copolymer to said polypropylene resin is 20:80 to 60:40.

6. A multilayer film as claimed in claim 1, wherein the weight ratio of said ethylene/alpha-olefin copolymer to said polypropylene resin is 30:70 to 50:50.

7. A multilayer film as claimed in claim 1, wherein said polyethylene resin is at least one member selected from the group consisting of linear low density polyethylenes and very low density linear polyethylenes.

8. A multilayer film as claimed in claim 1, wherein the number of said inner layers is three, wherein said three inner layers consist of two intermediate layers and a core layer interposed between said two intermediate layers and wherein each of said intermediate layers is formed of said blend.

9. A multilayer film as claimed in claim 8, wherein said core layer is formed of a mixture of said polyethylene resin with said blend.

10. A multilayer film as claimed in claim 1, wherein the film has a total thickness of a thickness of 10–35 μm.

11. A multilayer film as claimed in claim 1, and having a shrinkage value of 15–30% at 90° C. in both machine and transverse directions.

12. A multilayer film as claimed in claim 1, cross-linked by irradiation with actinic radiation.

* * * * *

UNITED STATES PATENT AND TRADEMARK OFFICE
CERTIFICATE OF CORRECTION

PATENT NO.:  5,614,315
DATED     :  Mar. 25, 1997
INVENTOR(S):  KONDO et al.

It is certified that error appears in the above-identified patent and that said Letters Patent is hereby corrected as shown below:

On the Title page, Item [73], the assignee's address "Amagasaki, Japan" should read --Marugame, Japan--

Signed and Sealed this

Twenty-ninth Day of July, 1997

Attest:

BRUCE LEHMAN

*Attesting Officer*         *Commissioner of Patents and Trademarks*